United States Patent Office 3,781,387
Patented Dec. 25, 1973

3,781,387
PREPARATION OF O-ALKYL S-DIALKYL-PHOSPHONOTHIOLATES
Arthur Henry Ford-Moore, Salisbury, and Alan Bebbington, Wistaston, Crewe, England, assignors to the Minister of Supply in Her Majesty's Government of the United Kingdom of Great Britain and Northern Ireland
No Drawing. Filed Nov. 2, 1956, Ser. No. 620,155
Claims priority, application Great Britain, Nov. 3, 1955, 31,438/55
Int. Cl. C07f 9/40
U.S. Cl. 260—979        4 Claims This invention relates to the manufacture of organic phosphorus compounds and more particularly in the production of alkylphosphonothiolates.

Many of these organic phosphorus compounds are toxic substances and their production is liable to be somewhat hazardous and moreover some of the intermediate compounds formed in the course of the production are troublesome to handle owing to the ease and rapidity with which they are oxidized in air.

The object of the invention is to provide an improved process for the manufacture of dialkylaminoalkyl derivatives of O-alkyl alkylphosphonothiolates such as O-ethyl S-diethylaminoethyl ethylphosphonothiolate.

Accordingly, the present invention consists in a process for the manufacture of O-alkyl S-dialkylaminoalkylphosphonothiolates, represented by the formula

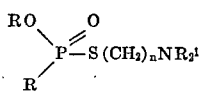

in which each R denotes an alkyl group with not more than 3 carbon atoms, R¹ denotes an alkyl group, such as methyl or ethyl, and $n$ is 2 or 3;

in which process a dialkyl alkylphosphonothionate is converted by hydrolysis into a monoalkyl hydrogen alkylphosphonothionate which is converted to the corresponding alkali-metal salt and then reacted with a dialkylaminoalkyl halide to form the required product which is then isolated.

The process may be represented in a general manner by graphic formulae which illustrate the successive stages as follows:

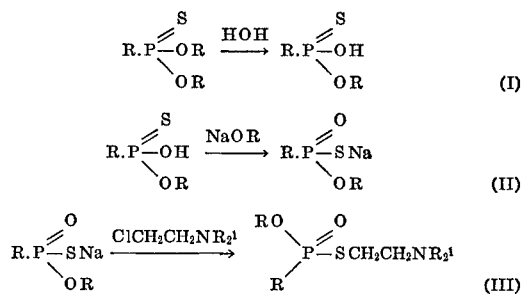

In order that the invention may be readily understood the same will be described, by way of example, for the production of O-ethyl S-diethylaminoethyl ethylphosphonothiolate having the formula:

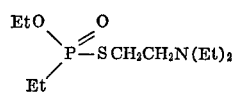

The first part of the process concerns the production of the starting material O,O-diethyl ethylphophonothio-nate, which may be made from ethylphosphonous dichloride (i.e. ethyldichlorophosphine). This compound is converted to diethylethylphosphonite ester by reaction with ethanol in the presence of an acid binding organic tertiary base e.g. diethylaniline, and then without separating the said ester, reacting the ester with sulphur flowers to form the thionate, O,O-diethyl ethylphonphonothionate

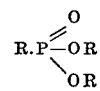

This compound is then used as starting material for the present invention.

The diethyl compound is subjected to half-hydrolysis by ethanolic sodium (or potassium) hydroxide by heating the mixture under reflux for some hours, then removing the diluent under reduced pressure and the residue is dissolved in water, acidified and extracted with ether. After removing the ether the residue is purified by distillation under reduced pressure to yield the ethyl hydrogen ethylphosphonothionate. The yield of acid ester is about 74 percent of the ester consumed.

The acid ester is then converted to the sodium salt by adding a given weight to methanol containing the equivalent quantity of sodium methoxide. The methanol is then removed by azeotropic distillation with benzene and the resultant suspension of the sodium salt in benzene treated with diethylamineoethyl chloride. The mixture is heated under reflux for a time and then allowed to stand at room temperature for some hours. An equal volume of light petrol (B.P. 40–60° C.) is added to precipitate the sodium chloride which is then filtered. The diluents are recovered from the filtrate by distillation and the residue distilled in vacuo. The yield of O-ethyl S-diethylaminoethyl ethylphosphonothiolate is about 78 percent.

O-ethyl S-2-diethylaminoethyl methylphosphonothiolate is prepared in an analogous manner from ethyl sodium methylphosphonothiolate.

The process may be carried out in dry benzene as diluent as described, and also in dry acetone or dry ethanol.

An alternative method using an aqueous medium is as follows. The acid ester prepared from the diethyl ester, as described above, is dissolved with cooling in aqueous sodium hydroxide containing one equivalent of base. Diethylaminoethyl chloride hydrochloride (one mole) and aqueous sodium hydroxide (one mole) are added, the mixture placed in a continuous extraction apparatus of high efficiency and allowed to stand at room temperature for a few hours for the components to react. The mixture is then extracted with benzene for several hours, and the benzene extract worked up in the usual way for the separation of the product. The product on distillation in a high vacuum is obtained in about 74 percent yield with practically no residue. The refractive index $n_D^{25}=1.4772$ agrees very closely with that of a specially purified sample 1.4776. This method (the so-called "water method") of preparing the S-dialkylaminoalkyl alkylphosphonothiolates has several advantages over other methods. It is very simple to carry out, no organic solvent or heating are required and above all the highly objectionable toxic filtration to remove the sodium chloride is avoided.

The modification of the process using an aqueous medium is effective when R in OR is ethyl or isopropyl, R in R.P is methyl or ethyl, and R¹ is ethyl, but if the modified process is used for the production of S-2-dimethylaminoethyl derivatives i.e. if R¹ is methyl, then dimerization to the tetramethyl piperazinium compound will be found to occur.

We claim:
1. Process for the production of O-alkyl S-dialkylaminoalkyl alkylphosphonothiolates of the formula:

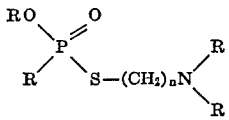

in which R denotes lower alkyl groups of not more than 3 carbon atoms and $n$ represents a number from 1 to 3, which process comprises the half hydrolysis of an O,O-dialkyl alkylphosphonothionate with ethanolic sodium hydroxide by heating the mixture at reflux temperatures to form a monoalkyl hydrogen alkylphosphonothionate, separating the said monoalkyl hydrogen compound and reacting the same with sodium methoxide in methanol to form the corresponding sodium salt, then removing the methanol by azeotropic distillation with benzene and reacting the said sodium salt with a dialkylaminoalkyl chloride by heating the mixture at reflux temperatures and then allowing the mixture to cool to room temperature, ading a low-boiling hydrocarbon to precipitate the sodium chloride by-product, filtering the same and isolating the product from the filtrate by distillation.

2. Process for the production of O-ethyl S-2-diethylaminoethyl ethylphosphonothiolate which comprises the half-hydrolysis of O,O-diethyl ethylphosphonothionate with ethanolic sodium hydroxide by heating the mixture at reflux temperatures to form ethyl hydrogen ethylphosphonothionate, separating the said ethyl hydrogen compound and reacting the same with sodium methoxide in methanol to form the corresponding sodium salt, then removing the methanol by azeotropic distillation with benzene and reacting the said sodium salt with 2-diethyl aminoethyl chloride by heating the mixture at reflux temperatures and then allowing the mixture to cool to room temperature, precipitating and removing the sodium chloride by-product and isolating the product from the residual solution by distillation.

3. Process for the production O-ethyl S-2-diethylaminoethyl ethylphosphonothiolate which comprises dissolving ethyl hydrogen ethylphosphonothionate in one equivalent of aqueous sodium hydroxide and adding an aqueous solution containing a molar equivalent of diethylaminoethyl chloride hydrochloride and sodium hydroxide, allowing the mixture to stand at room temperature to react for a few hours, extracting the mixture with boiling benzene, separating the benzene extract, recovering the benzene by distillation, and distilling the residue in vacuo to isolate the required product.

4. Process according to claim 3 which comprises the use of O,O-diethyl methylphosphonothionate as the starting compound.

References Cited
Kabachnik et al.: "Zhur. Obschchei Khim.," 26, 2228–33 (1956).
"Chem. Abst.," vol. 51 (1957), col. 1823–4.

LELAND A. SEBASTIAN, Primary Examiner

U.S. Cl. X.R.

260—983, 987